United States Patent
Park et al.

(10) Patent No.: US 9,068,075 B2
(45) Date of Patent: Jun. 30, 2015

(54) THERMOSETTING RESIN COMPOSITION FOR STEEL INSERTS AND METHOD FOR PRODUCTION THEREOF

(71) Applicants: Hyundai Motor Company, Seoul (KR); Hanwha L&C Corporation, Seoul (KR); Hyundai Mobis Co., Ltd., Seoul (KR)

(72) Inventors: Sang-Sun Park, Gyeonggi-Do (KR); Se-Young Kim, Daejeon (KR); Jong-Sung Park, Incheon (KR); Ji-Seong Kim, Seoul (KR); Sang-Gyu Jang, Gyeongsangbuk-do (KR)

(73) Assignees: Hyundai Motor Company, Seoul (KR); Hanwha L&C Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/144,912

(22) Filed: Dec. 31, 2013

(65) Prior Publication Data

US 2015/0005428 A1  Jan. 1, 2015

(30) Foreign Application Priority Data

Jun. 26, 2013  (KR) .................. 10-2013-0074085

(51) Int. Cl.
| | |
|---|---|
| *C08L 33/06* | (2006.01) |
| *C08L 67/06* | (2006.01) |
| *C08L 23/06* | (2006.01) |
| *C08L 31/04* | (2006.01) |
| *C08L 53/00* | (2006.01) |
| *C08L 75/04* | (2006.01) |
| *C08K 3/40* | (2006.01) |
| *C08K 3/18* | (2006.01) |
| *C08K 3/22* | (2006.01) |

(52) U.S. Cl.
CPC ............... *C08L 67/06* (2013.01); *C08L 23/06* (2013.01); *C08L 31/04* (2013.01); *C08L 53/00* (2013.01); *C08L 75/04* (2013.01); *C08K 3/40* (2013.01); *C08K 2003/2227* (2013.01); *C08K 3/18* (2013.01)

(58) Field of Classification Search
CPC ......... C08L 67/06; C08L 23/06; C08L 31/04; C08L 53/00; C08L 75/04; C08K 3/40; C08K 3/36; C08K 2003/2227; C08K 3/18
USPC .................................................. 524/425, 436
See application file for complete search history.

(56) References Cited

U.S. PATENT DOCUMENTS

| | | | |
|---|---|---|---|
| 3,830,772 A * | 8/1974 | Busch et al. ................. | 523/514 |
| 4,137,215 A | 1/1979 | Van Gasse | |
| 2003/0215588 A1 * | 11/2003 | Yeager et al. ............... | 428/35.7 |

FOREIGN PATENT DOCUMENTS

| | | |
|---|---|---|
| JP | 2002-060608 | 2/2002 |
| KR | 10-2010-0040480 A | 4/2010 |
| KR | 10-2013-0013684 A | 2/2013 |

*Primary Examiner* — John Uselding
(74) *Attorney, Agent, or Firm* — Mintz Levin Cohn Ferris Glovsky and Popeo, P.C.; Peter F. Corless

(57) ABSTRACT

Disclosed is a thermosetting resin composition for steel inserts, the composition including a thermosetting resin composite and a glass fiber. The thermosetting resin composite preferably includes 100 PHR of an unsaturated polyester resin, about 30 to 40 PHR of a low shrinkage agent, about 5 to 8 PHR of a release agent, about 130 to 140 PHR of a filler, about 2 to 8 PHR of a thickening agent, and about 1 to 2 PHR of a curing agent, based on 100 PHR of the unsaturated polyester resin. The thermosetting resin composition provides reduced costs and weight as compared to a steel material composed of only steel, and also exhibits physical properties comparable to the steel material.

6 Claims, 2 Drawing Sheets

THERMOSETTING RESIN COMPOSITION FOR STEEL INSERTS AND METHOD FOR PRODUCTION THEREOF

CROSS-REFERENCE TO RELATED APPLICATION

This application claims priority to and the benefit of Korean Patent Application No. 10-2013-0074085, filed on Jun. 26, 2013, the disclosure of which is incorporated herein by reference in its entirety.

BACKGROUND

1. Field of the Invention

The present invention relates to a thermosetting resin composition for steel inserts, and more particularly, to a thermosetting resin composition for steel inserts which is lightweight and has excellent physical properties, particularly through use of a glass fiber and a thermosetting resin composite containing an unsaturated polyester resin.

2. Discussion of Related Art

In connection with efforts to provide energy savings and reduce impact on the environment, steady research has been conducted towards replacing heavy steel materials with a lightweight plastic material. Such lightweight plastic materials could potentially improve fuel efficiency and increase the power output, etc. of vehicles.

One essential goal is to manufacture a lightweight electric automobile. However, electric automobiles exhibit poor power output and fuel efficiency compared with automobiles equipped with an internal combustion engine. Thus, leading global automobile companies have devoted significant time towards manufacturing a lightweight car body using plastic materials.

Among the plastic materials currently used to manufacture a lightweight automobile thermosetting resin is the most widely used. A thermosetting resin is a resin whose shape is not changed even when the resin is molded by application of heat and pressure using a curing reaction, followed by applying heat again to the molded product.

Thermosetting resins typically have excellent heat resistance, chemical resistance, mechanical properties and electrical insulating properties. Further, such thermosetting resins may be prepared into a molded product having excellent physical properties since the thermosetting resin includes a filler. In particular, the thermosetting resin may be prepared into a fiber-reinforced plastic since a reinforced fiber, such as a glass fiber, is added to the thermosetting resin.

Although the filler and the reinforced fiber are added to the thermosetting resin to prepare a thermosetting resin composition having relatively excellent physical properties, the thermosetting resin has a problem in that it is not applicable to structures which must continuously withstand high loads.

In an attempt to solve this problem, a method has been developed by which a steel-reinforced material is locally used to make up for insufficient physical properties of the thermosetting resin. However, is problematic to use the steel-reinforced material locally in large panel parts, such as a lower battery case for electric vehicles. Therefore, a method has been developed in which a steel-reinforced material is added to a thermosetting resin composition and the thermosetting resin composition is molded into the large panel shape.

FIG. 1 is a three-dimensional diagram of a steel sheet 100 that is inserted into a lower case of a battery, and FIG. 2 is a three-dimensional diagram of a lower case of a battery for electric vehicles into which the steel sheet 100 is inserted.

When a reinforced material of a steel sheet 100 shown in FIGS. 1 and 2 is first inserted into the thermosetting resin composition and the thermosetting resin composition is then molded, especially when the thermosetting resin composition is put into a mold, the flow of the thermosetting resin composition injected into the mold is hampered due to the presence of the steel sheet 100 distributed over the thermosetting resin composition. This results in inferior goods such as a poorly molded product.

Also, since there is a difference in shrinkage rate between the thermosetting resin composition and the steel sheet during a cooling process, even after the molding is completed, the interface between the thermosetting resin composition and the steel sheet may become separated.

SUMMARY OF THE INVENTION

The present invention has been proposed to solve the above drawbacks, particularly so as to provide a thermosetting resin composition for steel inserts capable of improving the flowability of a composition upon molding, so as to solve the problem of interfacial separation caused by different shrinkage rates of dissimilar materials, and so as to provide sufficient structural strengths and a lightweight effect. In particular, the present invention provides a thermosetting resin composition for steel inserts which is more lightweight than a steel material and has excellent moldability, adhesivity, durability, thermal impact resistance and electromagnetic wave shielding property. More particularly, such properties are provided through the use of a composition including a glass fiber and a thermosetting resin composite containing an unsaturated polyester resin, a low shrinkage agent, a release agent, a filler, a thickening agent and a curing agent.

According to one aspect, the present invention provides a thermosetting resin composition for steel inserts, the thermosetting resin comprising a thermosetting resin composite and a glass fiber. According to various embodiments, the thermosetting resin composite includes one or more of about 30 to 40 PHR (parts per hundred rubbers) of a low shrinkage agent, about 5 to 8 PHR of a release agent, about 130 to 140 PHR of a filler, about 2 to 8 PHR of a thickening agent, and about 1 to 2 PHR of a curing agent, based on 100 PHR of an unsaturated polyester resin.

According to various embodiments, the thermosetting resin composite and the glass fiber are present at contents of about 60 to 70% by weight and about 30 to 40% by weight, respectively, based on the total weight of the composition.

According to various embodiments, the unsaturated polyester resin has a degree of unsaturation of approximately 50% and a curing exothermic temperature of approximately 210° C.

The low shrinkage agent can be any conventional low shrinkage agent and, according to various embodiments, the low shrinkage agent is one or more, and preferably at least two selected from the group consisting of polyethylene, polyvinylacetate, polybutadiene, and polyurethane.

The filler can be any conventional filler and, according to various embodiments, the tiller is at least one selected from the group consisting of calcium carbonate, aluminum hydroxide, and silica.

Any conventional glass fibers can suitably be used in the present composition, and preferably, the glass fiber is one having an average diameter of about 10 to 15 μm.

According to another aspect, the present invention provides a thermosetting resin molded product for steel inserts prepared from the composition according to the present invention.

According to various embodiments, the molded product is a molded product into which a steel sheet is inserted.

Other features and aspects of the present invention will be apparent from the following detailed description, drawings and claims.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
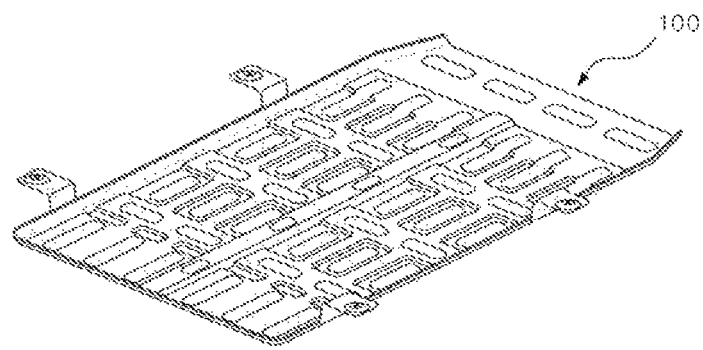
FIG. 1 is a three-dimensional diagram of a conventional steel sheet included in a lower case of a battery for electric vehicles.
Figure 2:
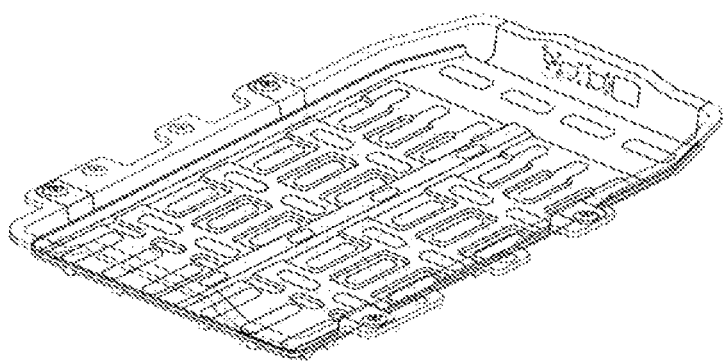
FIG. 2 is a three-dimensional diagram of a conventional lower case of a battery for electric vehicles into which a steel sheet is inserted.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF EXEMPLARY EMBODIMENTS

Hereinafter reference will now be made in detail to various embodiments of the present invention, examples of which are illustrated in the accompanying drawings and described below.

Prior to the description, it should be understood that the terminology used in the specification and appended claims should not be construed as limited to general and dictionary meanings, but interpreted based on the meanings and concepts corresponding to technical aspects of the present invention on the basis of the principle that the present inventors are allowed to define the terms appropriately for the best explanation. Therefore, the description proposed herein is just a preferable example for the purpose of illustrations only, not intended to limit the scope of the invention, so it should be understood that other equivalents and modifications could be made thereto without departing from the scope of the invention. It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

One aspect of the present invention provides a thermosetting resin composition for steel inserts.

In particular, the thermosetting resin composition includes a thermosetting resin composite and a glass fiber. According to various embodiments, the thermosetting resin composite further includes one or more additional components selected from a low shrinkage agent, a release agent, a filler, a thickening agent, and a curing agent. According to preferred embodiments, the thermosetting resin composite includes about 30 to 40 PHR of a low shrinkage agent, about 5 to 8 PHR of a release agent, about 130 to 140 PHR of a filler, about 2 to 8 PHR of a thickening agent, and about 1 to 2 PHR of a curing agent, based on 100 PHR of an unsaturated polyester resin component. According to preferred embodiments, the thermosetting resin composite and the glass fiber are present at contents of about 60 to 70% by weight and about 30 to 40% by weight, respectively, based on the total weight of the composition.

Hereinafter, the components and contents thereof according to the present invention will be described in further detail.

Unsaturated Polyester Resin

The unsaturated polyester resin is a colorless transparent thermosetting resin that is a base of the thermosetting resin composite. Preferably, the unsaturated polyester resin is prepared by allowing a divalent alcohol and the like to react with an unsaturated dicarboxylic acid, such as anhydrous maleic acid and fumaric acid. The unsaturated polyester resin has excellent mechanical strengths such as thermal impact resistance and vibration resistance, and excellent properties such as chemical resistance and weather resistance.

The unsaturated polyester resin has numerous advantages in that it may be prepared in a lightweight design, does not easily corrode, has excellent workability that allows for the formation of complicated shapes or structures, and may be cured at low temperatures which include room temperature, generates low amounts of gases during a curing process, and does not require application of high pressure during a molding process. Therefore, the unsaturated polyester resin of the present resin is beneficial for use as a resin for reinforced plastics including a glass fiber and the like. In this case, the unsaturated polyester may be any conventional unsaturated polyester providing such noted properties and, preferably, is one which has a degree of unsaturation of approximately 50% and a curing exothermic temperature of approximately 210° C.

According to preferred embodiments, the unsaturated polyester resin is present at a content of 100 PHR, wherein the 100 PHR is the basis of the other components in the composition. When the content of the unsaturated polyester resin is less than 100 PHR, a curing exothermic temperature may be reduced, which results in degraded mechanical strengths of a resulting product, such as thermal impact resistance and vibration resistance, and reduced surface gloss. On the other hand, when the content of the unsaturated polyester resin exceeds 100 PHR, the curing exothermic temperature may be increased excessively, which may cause generation of molding cracks of a molded product, shrinkage of the molded product which may cause bending of the molded product, and various components may be broken away, which results in non-uniform physical properties.

Low Shrinkage Agent (Additive)

The low shrinkage agent serves to improve an adhesive strength between the molded product and the steel sheet. In particular, the low shrinkage agent controls a shrinkage rate of a molded product, which shrinks during a cooling process after molding is performed at a high temperature, and further prevents breakaway, which may be caused by the difference in shrinkage rate between the molded product and the steel sheet inserted into the molded product.

Any compounds known in the related art may be used as the low shrinkage agent. According to preferred embodiments, the low shrinkage agent includes at least two selected from the group consisting of polyethylene, polyvinylacetate, polybutadiene, and polyurethane. In this case, the at least two selected low shrinkage agents may form a chemical bond before the low shrinkage agents are mixed with the further components of the thermosetting resin composition.

According to preferred embodiments, the low shrinkage agent is present at a content of about 30 to 40 PHR, based on 100 PHR of the unsaturated polyester resin. When the content of the low shrinkage agent is less than 30 PHR, the function of the low shrinkage agent to control the shrinkage rate of the molded product may be suddenly lowered after molding of the molded product. As a result, an attachment site between the molded product and the steel sheet inserted into the molded product may be broken away, which results in bending of the molded product. On the other hand, when the content of the low shrinkage agent exceeds 40 PHR, the shrinkage rate may be excessively increased after molding of the molded product. As a result, the mold may be closely attached to the molded product, which makes it difficult to remove the mold from the molded product. Further, cracks may be increasingly generated in the molded product, and uneven brightness, flow marks and fine pores may be formed at a surface of the molded product.

Release Agent

The release agent serves to prevent a mold from adhering to a molded product when a composition is molded to prepare the molded product. The release agent generally has a structure similar to a surfactant, particularly, a structure in which one moiety of the release agent molecule is attracted to a thermosetting resin and the other moiety of the release agent molecule is repelled by a metal which is a main material of the mold. Therefore, since the molded product prepared from a composition including the release agent is repelled by the metal of the mold, the release agent serves to prevent the molded product from adhering to the mold.

According to preferred embodiments, the release agent is present at a content of about 5 to 8 PHR, based on 100 PHR of the unsaturated polyester resin. When the content of the release agent is less than 5 PHR, the molded product may not be easily separated from the mold, which results in poor workability. On the other hand, when the content of the release agent exceeds 8 PHR, the steel sheet may be separated from the molded product due to a decrease in adhesive strength between the molded product and the steel sheet upon insertion of the steel sheet into the molded product. As such, the molded product may fall away from the mold and be damaged after molding. In addition, a surface of the molded product does not have a sufficient adhesive strength due to the presence of the release agent on the surface of the molded product, which may make it difficult to perform a painting or adhesion process.

Filler

The filler serves to improve the strength of a composition and control a shrinkage rate of a molded product. Any fillers known in the related art may be suitably used as the filler. According to preferred embodiments, the filler is an inert mineral material exhibiting no chemical reaction, and, more preferably, is at least one selected from the group consisting of calcium carbonate, aluminum hydroxide, and silica.

According to preferred embodiments, the filler is present at a content of about 130 to 140 PHR, based on 100 PHR of the unsaturated polyester resin. When the content of the filler is less than 130 PHR, an attachment site between the molded product and the steel sheet inserted into the molded product may be broken away due to excessive shrinkage of the molded product, which results in degraded physical properties of the molded product and bending of the molded product. On the other hand, when the content of the filler exceeds 140 PHR, the filler may interfere with the performance of the low shrinkage agent, and thus an attachment site between the molded product and the steel sheet inserted into the molded product may be broken away due to a difference in shrinkage rate.

Thickening Agent

The thickening agent serves to enhance the viscosity of the thermosetting resin composition to prevent various components of the composition from being separated from each other, and changes the composition from a liquid phase to a solid phase to easily fill a mold with the composition prior to a compression molding process. Any thickening agents known in the related art may be used as the thickening agent, and according to preferred embodiments, the thickening agent is an oxide or hydroxide of an alkaline earth metal.

According to preferred embodiments, the thickening agent is present at a content of about 2 to 8 PHR, based on 100 PHR of the unsaturated polyester resin. When the content of the thickening agent is less than 2 PHR, an increase in viscosity of the composition is not sufficient, and thus a mold may not be easily filed with the composition, which results in overall degraded workability. On the other hand, when the content of the thickening agent exceeds 8 PHR, an excessive increase in viscosity of the composition may apply an excessive pressure to the composition during a compression molding process, and thus the steel sheet inserted into the composition may be out of position. Further, portions of the mold, such as deep within the mold may not be completely filled with the composition, resulting in inferior molded products.

Curing Agent

The curing agent serves to cure the thermosetting resin composition through a curing reaction. Any curing agents known in the related art may be used as the curing agent, and according to preferred embodiments, the curing agent is a peroxide conventionally used in a cross-linking reaction to manufacture polymeric plastics.

According to preferred embodiments, the curing agent is present at a content of about 1 to 3 PHR, based on 100 PHR of the unsaturated polyester resin. When the content of the curing agent is less than 1 PHR, the composition may be slowly cured, and thus economic efficiency in manufacturing the molded product may be degraded. On the other hand, when the content of the curing agent exceeds 3 PHR, cracks in a molded product may be generated due to an excessively rapid curing rate of the composition, which results in degraded manufacturing stability.

Glass Fiber

The glass fiber refers to a long mineral fiber having a fine-filament shape, and serves to enhance mechanical properties of the thermosetting resin composition, such as in a base steel sheet in a base steel concrete. Any glass fibers known in the related art may be used as the glass fiber, and according to preferred embodiments, the glass fiber is an E-glass fiber composed of glass fiber filaments having an average diameter of approximately 10 to 15 µm.

According to preferred embodiments, the glass fiber is present at a content of about 30 to 40% by weight, based on the total weight of the composition. When the content of the glass fiber is less than 30% by weight, it is difficult to ensure sufficient structural strength of the composition. On the other hand, when the content of the glass fiber exceeds 40% by weight, excessive pressure may be applied to a steel sheet inserted into the composition during a molding process and, thus, the steel sheet inserted into the composition may be out of position. Also, since an excessive content of the glass fiber may result in a decrease in the content of the other components, adhesivity, moldability and release performance may be degraded, and the appearance of the molded product may not be as desired.

Usage

The thermosetting resin composition for steel inserts according to the present invention is preferably applicable for use with large panel parts requiring a high hardness. According to particularly preferred embodiments, the thermosetting resin composition is applicable to a battery case, especially a lower case of a battery for electric automobiles. When the thermosetting resin composition is applied to the lower case of the battery, a steel panel is preferably inserted into a molded product prepared from the composition.

Manufacturing Method

The thermosetting resin composition for steel inserts according to the present invention may be prepared according to any known techniques. According to a preferred embodiment, the thermosetting resin composition includes about 60-70% by weight of a thermosetting resin composite and about 30 to 40% by weight of a glass fiber, based on the total weight of the composition. To realize the compositional characteristics as described above, the thermosetting resin composite preferably includes about 30 to 40 PHR of a low shrinkage agent, about 5 to 8 PHR of a release agent, about 130 to 140 PHR of a filler, about 2 to 8 PHR of a thickening agent, and about 1 to 2 PHR of a curing agent, based on 100 PHR of an unsaturated polyester resin component.

Figure 3:
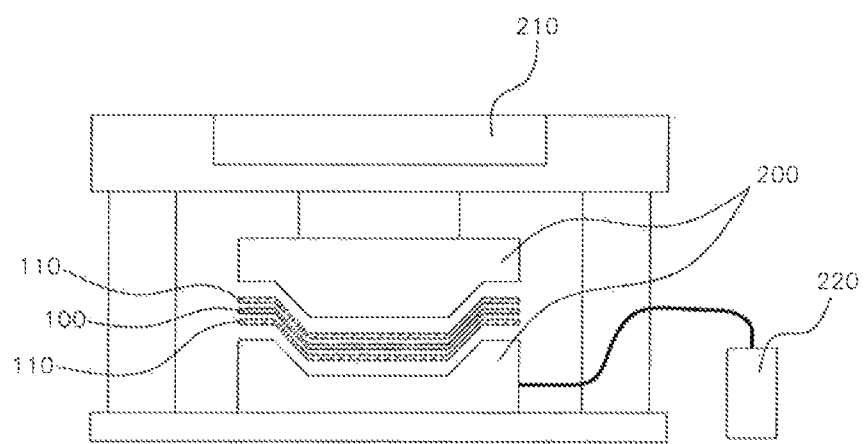
FIG. 3 is a schematic view of a molding machine according to an embodiment of the present invention.

FIG. 3 is a schematic view of a molding machine used in accordance with embodiments of the present invention, and a method of manufacturing a molded product will be described referring to FIG. 3. The method of manufacturing a molded product of large sized parts, etc., such as a lower case of a battery, using the composition according to the present invention may include the first step of positioning a steel sheet 100 to be inserted into a molded product between upper and lower molds 200 of a high-pressure molding machine 210; the second step of injecting a thermosetting resin composition 110 for steel inserts between the molds 200; the third step of compression molding the injected composition 110; and the fourth step of removing the compression-molded molded product from the molds 200.

According to preferred embodiments, each of the molds 200 is provided with a vacuum evaporator 220. The vacuum evaporator 220 serves to smoothly exhaust air from the molds as well as gases generated upon compression molding of the composition. The vacuum evaporator 220 further facilitates the smooth flow of the composition when the composition is injected between the molds. Accordingly, the vacuum evaporator 220 aids in ensuring uniform physical properties of the molded product.

EXAMPLES

Hereinafter, the present invention will be described in further detail with reference to the following exemplary embodiments. However, it should be apparent to those skilled in the art that the detailed description provided herein is merely intended to provide a better understanding of the present invention, but is not intended to limit the scope of the present invention.

The Examples were performed so as to determine the physical properties of the thermosetting resin composition for steel inserts according to the present invention, A specimen, particularly a lower case of a battery, which included the components and their contents as listed in the following Table 1, was prepared. The specimen was analyzed to determine the molded product weight, moldability (shape feasibility), adhesivity to steel, vibration resistance, thermal impact resistance and an electromagnetic wave shielding property. The results are summarized and listed in the following Table 2, and the results of the maximum loads and shear strengths are summarized in the following Table 3.

TABLE 1

| | | | | Comparative Examples | | |
|---|---|---|---|---|---|---|
| Items | | Example 1 | 1 | 2 | | 3 |
| Steel | | — | 100% by weight | — | | — |
| Thermosetting resin composite | UPR | 65% by weight | 100 PHR | 50% by weight | 100 PHR | 80% by weight | 100 PHR |
| | Low shrinkage agent | | 35 PHR | | 25 PHR | | 45 PHR |
| | Release agent | | 7 PHR | | 7 PHR | | 7 PHR |

TABLE 1-continued

| Items | Example 1 | Comparative Examples | | |
| | | 1 | 2 | 3 |
| --- | --- | --- | --- | --- |
| Filler | 140 PHR | — | 160 PHR | 120 PHR |
| Thickening agent | 5 PHR | — | 7 PHR | 9 PHR |
| Curing agent | 2 PHR | — | 2 PHR | 2 PHR |
| Glass fiber | 35% by weight | — | 50% by weight | 20% by weight |

Table 1 lists the compositions of the specimens prepared in Example 1 and Comparative Examples 1 to 3.

As listed in Table 1, the contents of the steel, the thermosetting resin composite and the glass fiber, all of which constituted the specimen, were denoted in a unit of percent by weight, based on the total weight of the specimen, and the contents of the components in the thermosetting resin composite were set based on 100 PHR of the unsaturated polyester resin.

TABLE 2

| Items | Example 1 | Comparative Examples | | |
| | | 1 | 2 | 3 |
| --- | --- | --- | --- | --- |
| Molded product weight (kg/set) | 25 | 35 | 25 | 25 |
| Moldability (shape feasibility) | OK | — | N.G | N.G |
| Adhesion to steel | OK | — | N.G | N.G |
| Vibration resistance | OK | OK | — | — |
| Thermal impact resistance | OK | OK | — | — |
| Electromagnetic wave shielding property | OK | OK | — | — |

OK: Good
N.G: Poor

Table 2 lists the results obtained by measuring and comparing the molded product weights, moldability, adhesion to steel, vibration resistance, thermal impact resistance and electromagnetic wave shielding properties of the specimens as listed in Table 1.

Figure 4:
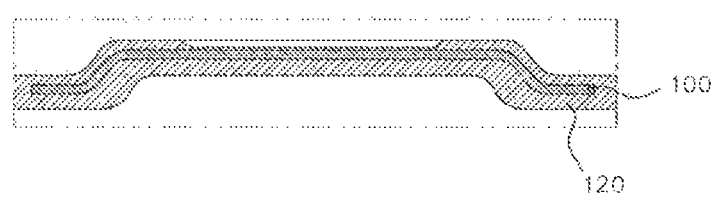
FIG. 4 is a cross-sectional view of a molded product into which a steel sheet is inserted according to an embodiment of the present invention.

The moldability was measured to determine whether an apparent shape of the molded product could be realized, and defects such as incomplete molding were noted. FIG. 4 is a cross-sectional view of a molded product into which a steel sheet was inserted. As shown in FIG. 4, the molded product 120 was adhered to the steel sheet 110. Therefore, the adhesion to steel was measured to determine whether the steel sheet was separated from the molded product, as viewed from a cross-section of the molded product with the naked eye. The vibration resistance was measured to determine whether defects appeared on a specimen through visual observation and non-destructive testing of the specimen after vibration generated on a road surface during actual car driving were applied to the specimen by means of special equipment. The thermal impact resistance was measured to determine whether defects appeared on a specimen through visual observation and non-destructive testing of the specimen after a test in which impact was applied on the specimen by alternately applying high and low temperatures to the specimen for a short period of time. The electromagnetic wave shielding property was measured to determine whether electromagnetic waves transferred through the specimen.

In particular, the moldability and the adhesion to steel could not be confirmed in the case of Comparative Example 1, and the tests were not further carried out since the moldability and the adhesion to steel were confirmed to be poor in the case of Comparative Examples 2 and 3.

On the other hand, in the case of Example 1 as listed in Table 1, the weight of the specimen decreased by approximately 30%, compared to Comparative Example 1 in which the specimen included only steel, but the vibration resistance, the thermal impact resistance and the electromagnetic wave shielding property were comparable to Comparative Example 1 in which the specimen included only steel. Also, the moldability and the adhesion to steel were demonstrated to be poor in the case of Comparative Examples 2 and 3, but were good in the case of Example 1. Therefore, it was demonstrated that the specimen prepared in Example 1, which was in accordance with the present invention, had a lightweight effect in that its weight was decreased by approximately 30% compared to the specimen including steel that was a conventional material (Comparative Example 1), and also exhibited all good properties such as moldability, adhesion to steel, vibration resistance, thermal impact resistance and an electromagnetic wave shielding property. As a result, it was demonstrate that the specimen of Example 1 could be suitably used as a lower case of a battery, and the like.

TABLE 3

| Test name | Specimen No. | | Maximum load (kgf) | Shear strength (MPa) | Breaking type |
| --- | --- | --- | --- | --- | --- |
| Lap Shear | Example 1 | 1 | 163.26 | 5.12 | Broken material |
| | Example 1 | 2 | 154.54 | 4.85 | |
| | Example 1 | 3 | 191.96 | 6.02 | |
| | Example 1 | 4 | 176.11 | 5.53 | |
| | Example 1 | 5 | 184.47 | 5.79 | |
| | Comparative Example 2 | 1 | 31.89 | 1.02 | Peeled at interface |

Table 3 lists the results obtained by performing tests of the maximum load and shear strength of the specimens of Example 1 and Comparative Example 2. The maximum load was the highest load which a specimen endured in a tensile test, and the shear strength was measured to determine the adhesive strength of the specimen to steel. In this case, an ASTM D-3163 single lap shear adhesive joint test was used, and a shear rate was 5 mm/sec.

The tests were repeatedly performed on the specimen of Example 1. As a result, the mean maximum load was 174.07 kgf, and the mean shear strength was 5.46 MPa, which were approximately five times higher than those of the specimen of Comparative Example 2, which had a mean maximum load of 31.89 kgf and a shear strength of the 1.02 MPa. Accordingly, it was demonstrated that the thermosetting resin composition for steel inserts, including the components and contents according to the present invention, had excellent maximum load and shear strength as compared to the conventional material.

The thermosetting resin composition for steel inserts according to the present invention can, thus, provide the following effects. The thermosetting resin composition for steel inserts is a lightweight material that can provide a weight reduction of approximately 30%, as compared to the conventional materials which include only steel. This can be accomplished in view of the components of the thermosetting resin composition, which includes a glass fiber and a thermosetting resin composite containing an unsaturated polyester resin as a main ingredient.

Also, the thermosetting resin composition for steel inserts according to the present invention has a cost reduction effect since a smaller amount of steel can be used as compared to the conventional composition including only steel.

In addition, while the thermosetting resin composition for steel inserts according to the present invention is lighter in weight and lower in cost than the conventional composition including only steel, it still provides physical properties comparable to the conventional composition including only steel.

Furthermore, when a molded product into which a steel sheet is inserted is manufactured according to the present invention, attachment between the molded product and the steel sheet may be maintained since the molded product has a shrinkage rate similar to the steel sheet.

The present invention has been described in detail with reference to preferred embodiments thereof. However, it will be appreciated by those skilled in the art that changes may be made in these embodiments without departing from the principles of the invention, the scope of which is defined in the appended claims and equivalents thereof.

What is claimed is:

1. A thermosetting resin composition for steel inserts comprising a thermosetting resin composite and a glass fiber,
   wherein the thermosetting resin composite comprises about 100 PHR of an unsaturated polyester resin, about 30 to 40 PHR of a low shrinkage agent, about 5 to 8 PHR of a release agent, about 130 to 140 PHR of a filler, about 2 to 8 PHR of a thickening agent, and about 1 to 2 PHR of a curing agent, based on 100 PHR of the unsaturated polyester resin,
   wherein the low shrinkage agent comprises at least two selected from the group consisting of polyethylene, polybutadiene and polyurethane,
   wherein the filler comprises at least one selected from the group consisting of aluminum hydroxide and silica.

2. The thermosetting resin composition for steel inserts of claim 1, comprising about 60 to 70% by weight of the thermosetting resin composite and about 30 to 40% by weight of the glass fiber, based on the total weight of the thermosetting resin composition.

3. The thermosetting resin composition for steel inserts of claim 1, wherein the unsaturated polyester resin has a degree of unsaturation of about 50% and a curing exothermic temperature of about 210° C.

4. The thermosetting resin composition for steel inserts of claim 2, wherein the glass fiber has an average diameter of about 10 to 15 μm.

5. A thermosetting resin molded product for steel inserts prepared from the composition of claim 1.

6. The thermosetting resin molded product for steel inserts of claim 5, wherein the molded product is a molded product into which a steel sheet is inserted.

* * * * *